Nov. 23, 1926.

B. G. SIMMONS 1,608,344

FLOSSFONT

Filed Jan. 2, 1926

Inventor
B. G. SIMMONS,

By Jack T. Richmond
Attorney

Patented Nov. 23, 1926.

1,608,344

UNITED STATES PATENT OFFICE.

BERT G. SIMMONS, OF NEW BRUNSWICK, NEW JERSEY, ASSIGNOR TO JOHNSON & JOHNSON, OF NEW BRUNSWICK, NEW JERSEY, A CORPORATION OF NEW JERSEY.

FLOSSFONT.

Application filed January 2, 1926. Serial No. 78,894.

The invention is directed to a dental floss container and dispenser, wherein, through certain characteristics, the floss is maintained in a surgically-clean condition and is dispensed in a manner to preserve the original shape and condition of the floss while at the same time preventing even air admission to the container.

The main object of the invention is the provision of a container for a spool or like carrier of dental floss, with such container constructed of glass of sufficient mass and in such form that it is not required to be held while withdrawing and severing the desired length of floss.

A further object is the provision of a chamber in such container with a closure therefor adapted to seal the chamber, a spindle removably mounted in the closure and fixed end wall of the container being arranged to support a spool of floss, thus permitting the convenient recharging of the container, and utilizing the application of the spindle as a means for sealing the closure in place.

A further object is the provision of a cutter to be removably secured to the container to permit the floss when withdrawn to be readily severed, the container being exteriorly formed to more or less shroud the cutting edge to prevent accidental injury when reaching for or withdrawing the floss.

A further object is the provision of a sealing guide to overlie the floss outlet from the container, with such guide formed with an opening to just permit the passage of and conforming to the sectional shape of the floss, and constructed of a compressible material, to thereby effectively seal the container so far as the floss outlet is concerned. The normal resiliency of the guide closes effectively on the floss so long as there is no pulling stress on such floss, but yields to permit somewhat resisted passage of the floss when desired, thereby maintaining the floss in its original shape and condition during delivery.

A further object is to utilize the cutter as a means for holding the sealing guide in place, with the cutter, guide, spindle, and container closure readily separable to permit the container, otherwise an integral glass block, to be readily cleaned and sterilized to maintain the floss in a surgically-clean condition.

The invention in its preferred embodiment is shown in the accompanying drawings, wherein:—

Figure 1:
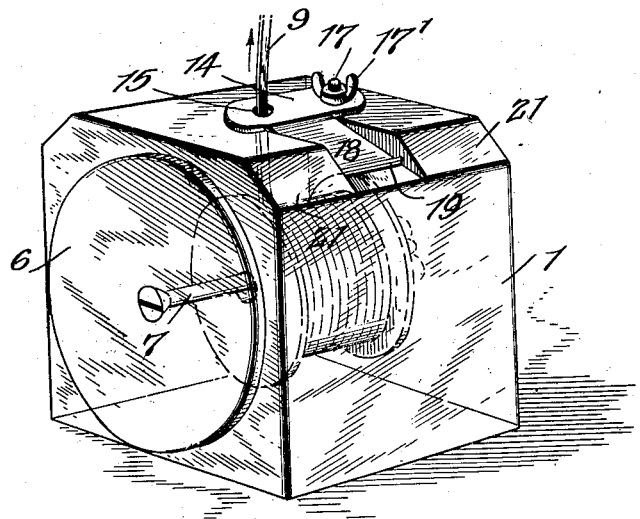
Fig. 1 is a perspective of the container and dispenser as constructed in accordance with the present invention.
Figure 2:
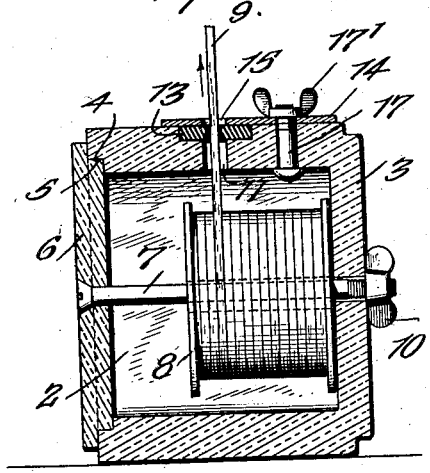
Fig. 2 is a vertical section through the same, parts being shown in elevation.
Figure 3:
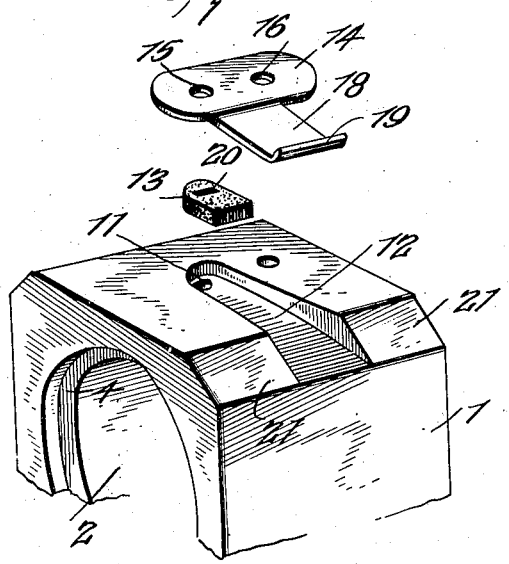
Fig. 3 is a broken perspective of the container, the sealing guide and cutter being shown spaced from their operative positions to illustrate their constructions.

The container or flossfont of this invention consists of a substantially cubical block, preferably of glass, as 1, centrally formed with a chamber 2, opening through one end of the block, the opposite end of the chamber being closed by an integral wall 3 of the block. The edge of the chamber opening is rabbeted at 4 to sealingly cooperate with a similar edge 5 of a closure 6 for the chamber, the closure being also of glass.

A spindle 7, is removably passed through the closure 6 and through the wall 3, thus providing for the rotative and sliding support of a spool or other similar carrier 8 on which the floss 9 is wound. This carrier is of the conventional form, and the floss is preferably in flat or ribbon shape, though obviously any form or shape of floss may be used. The spindle 7 has its head countersunk in the closure and a threaded end to project beyond the wall 3 to receive a nut 10, thus supporting the floss carrier, drawing the closure into sealing relation with the mouth of the chamber, while at the same time permitting, through the simple removal of the nut 10, of the separation of the parts to permit the introduction of a fresh carrier, or the cleaning of the container.

The floss ribbon 9 passes through an opening 11 in the top of the container, and this opening communicates with a channel 12 formed in the upper surface of the container and leading through the forward wall. A sealing guide 13 is loosely disposed in this channel, overlying and adjacent the opening 11, the guide conforming to the outline of the channel to prevent lateral displacement of the guide. A cutter 14 overlies the guide, this cutter comprising a metallic section formed with an opening 15 to aline with the opening 11 of the container, and a laterally disposed opening 16, whereby through the use of a bolt 17 passed through the top of the container from the chamber 2, and a nut 17' on the threaded end of such bolt beyond the cutter, the latter is held in place and at the same time confines and exerts pressure on the sealing guide 13. The cutter includes a forwardly projecting section 18, of a width to seat in the channel 12, and terminating in an upturned cutting edge 19. This cutting edge is substantially of the full width of the channel, and of such height above the bottom of the channel that the side walls of the latter extend above such cutting edge. This substantially guards the user against accidental injury from the cutting edge when reaching for the floss or moving the container, as will be apparent.

The sealing guide is formed with an opening 20, which when the parts are in position forms a passage for the floss after passing through the opening 11 in the container and before passing through the opening 15 in the cutter. This guide opening 20 conforms accurately to the shape of the floss, and owing to the resilient nature of the material of the guide and the pressure of the cutter thereon, the wall of such guide opening will close upon the floss ribbon and hold the same with at least a slight resistance to a pulling strain thereon. This sealing guide and opening therein is one of the important features of the invention, as thereby the floss may be withdrawn in a manner to maintain its shape and original condition, but, more particularly, both while the floss is being withdrawn and while merely projecting as shown, the substantial closing of this guide opening about the floss will absolutely prevent entrance of any foreign matter into the container. Thus the container is sealed about the floss delivery opening, even while the floss is being withdrawn.

The proper length of floss being withdrawn from the container, it is drawn laterally across the cutting edge 19 and severed. While this operation entails an appreciable pull, the mass of the container as a whole is such as to overcome the necessary pull on the floss in its tendency to move the container. This permits the floss to be smoothly and evenly withdrawn from the container and across the cutting edge with one hand, and without any necessity of holding the container during such operation.

The floss carrier can move longitudinally as well as rotate in the chamber 2, so that the floss is fed straight and even therefrom through the outlets. Furthermore, the end flanges of the conventional floss carriers project beyond the floss thereon, so that the floss cannot contact with the interior of the container at any time.

Obviously the metallic parts, the sealing guide, and the closure may be readily removed, to permit a thorough cleansing of the container at any time. The container, being of glass, not only provides an ornamental and attractive unit, but permits constant inspection of the contained floss, so that its condition, as well as reserve quantity may be readily ascertained without exposing the floss to the possible contamination of the outside air.

If desired, and as preferred the meeting edges of the side walls and top of the container are cut away or beveled at 21, permitting the floss to be more conveniently reached and severed than would be the case with the usual square edges.

Claims:

1. A flossfont made of glass and formed with a chamber, removable means for supporting a floss carrier in said chamber, said font being formed with a floss outlet and with channel surrounding and leading from said outlet, a sealing guide in said outlet, and a cutter secured to the font and overlying and holding the guide, said cutter having a cutting edge arranged in said channel.

2. A flossfont made of glass and formed with a chamber, removable means for supporting a floss carrier in said chamber, said font being formed with a floss outlet and with channel surrounding and leading from said outlet, a sealing guide in said outlet, and a cutter secured to the font and overlying and holding the guide, said cutter having a cutting edge arranged in said channel, the walls of the channel extending above the edge of the cutter.

3. A glassfont of cubical form having a chamber opening through one end and exteriorly formed with a channel leading through one edge, an opening leading from the chamber to the channel, a friction guide lying within the channel in operative relation to said opening, a keeper for the guide formed with a cutting edge shrouded by the walls of the channel, and a closure arranged for sealing the open end of the chamber.

In testimony whereof I affix my signature.

BERT G. SIMMONS.